United States Patent

Guzman et al.

Patent Number: 5,465,940
Date of Patent: Nov. 14, 1995

[54] EASY JACK

[76] Inventors: Paulino A. Guzman, P.O. Box 16, Lovelady, Tex. 75851; George Spector, 233 Broadway Rm 702, New York, N.Y. 10279

[21] Appl. No.: 303,733

[22] Filed: Sep. 9, 1994

[51] Int. Cl.⁶ .................................................. B60S 9/02
[52] U.S. Cl. ............................................................ 254/423
[58] Field of Search ..................... 254/423, 93 R, 254/93 H, 45

[56] References Cited

U.S. PATENT DOCUMENTS

| | | | |
|---|---|---|---|
| 2,444,272 | 6/1948 | Sragal | 254/423 |
| 5,224,688 | 7/1993 | Torres et al. | 254/423 |
| 5,232,206 | 8/1993 | Hunt et al. | 254/423 |

*Primary Examiner*—Robert C. Watson

[57] ABSTRACT

A pneumatic jack system for a motor vehicle comprising a pneumatic jack with a bracket for mounting the pneumatic jack to a suspension assembly of the motor vehicle between two wheels. A structure is for extending the pneumatic jack to the ground to raise the motor vehicle. An element is for retracting the pneumatic jack from the ground to lower the motor vehicle. A control switch is in the interior of the motor vehicle, for operating the extending structure and the retracting element. A component is for locking the control switch to prevent an unauthorized operation of the pneumatic jack.

2 Claims, 1 Drawing Sheet

EASY JACK

BACKGROUND OF THE INVENTION

The instant invention relates generally to vehicle lifting jacks and more specifically it relates to a pneumatic jack system for a motor vehicle, which provides a pneumatic jack mounted to a suspension assembly between two wheels.

There are available various conventional vehicle lifting jacks which do not provide the novel improvements of the invention herein disclosed.

SUMMARY OF THE INVENTION

A primary object of the present invention is to provide a pneumatic jack system for a motor vehicle, that will overcome the shortcomings of the prior art devices.

Another object is to provide a pneumatic jack system for a motor vehicle, which includes a pneumatic jack mounted to a suspension assembly between two wheels, for lifting the motor vehicle off the ground.

An additional object is to provide a pneumatic jack system for a motor vehicle, that can be key locked from within and from the exterior of the motor vehicle, to prevent an unauthorized operation of the pneumatic jack.

A further object is to provide a pneumatic jack system for a motor vehicle, that is simple and easy to use.

A still further object is to provide a pneumatic jack system for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
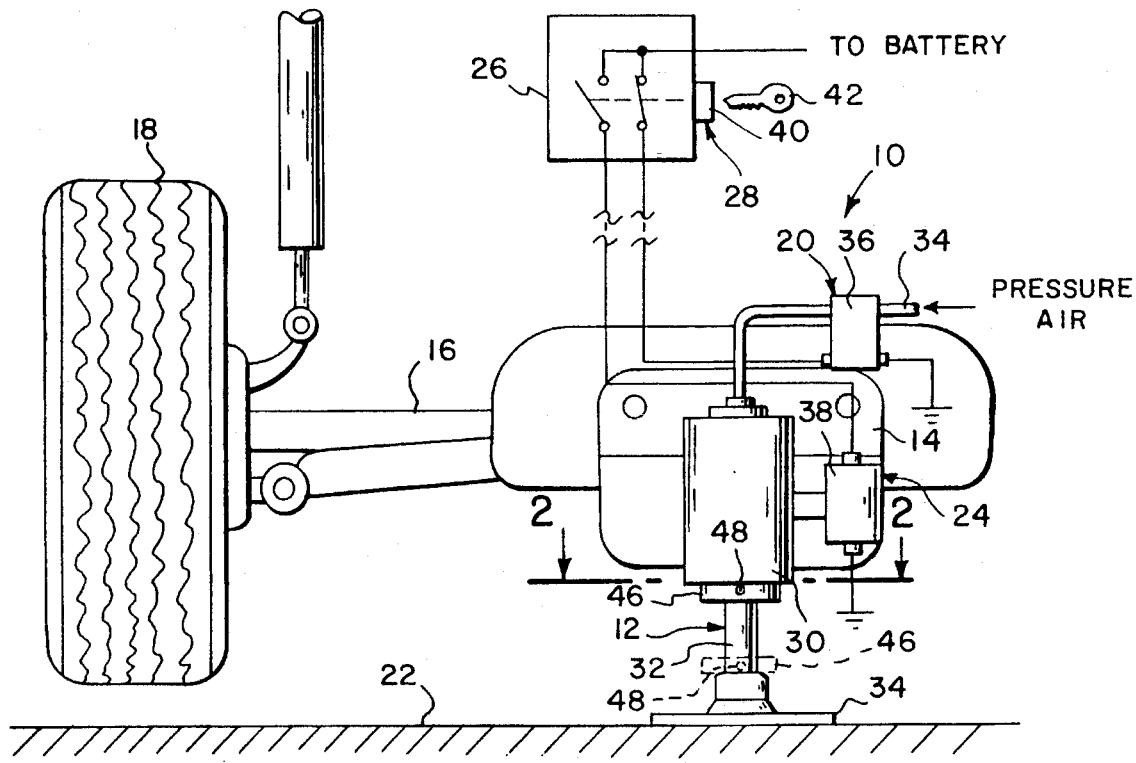
FIG. 1 is a diagrammatic elevational view, showing the instant invention mounted to a suspension assembly of a motor vehicle.

Turning now descriptively to the drawings, in which similar reference characters denote similar elements throughout the several views, FIG. 1 illustrates a pneumatic jack system 10 for a motor vehicle consisting of a pneumatic jack 12 with a bracket 14 for mounting the pneumatic jack 12 to a suspension assembly 16 of the motor vehicle between two wheels 18. A structure 20 is for extending the pneumatic jack 12 to the ground 22, to raise the motor vehicle. An element 24 is for retracting the pneumatic jack 12 from the ground 22, to lower the motor vehicle. A control switch 26 in the interior of the motor vehicle is for operating the extending structure 20 and the retracting element 24. A component 28 is for locking the control switch 26, to prevent an unauthorized operation of the pneumatic jack 12.

The pneumatic jack 12 includes a piston housing 30 with a piston rod 32 extending downwardly from the housing 30. A base plate 34 is connected to a distal end of the piston rod 32, which will contact the ground 22 when the piston rod 32 is extended. The structure 20 contains an air hose line 34 connected to the piston housing 30, for supplying pressured air thereto. A pressure solenoid valve 36 is located in the air hose line 34 and is electrically connected to the control switch 26. When the control switch 26 is turned in one direction, compressed air will enter the piston housing 30, causing the piston rod 32 to be extended from the piston housing 30.

The retracting element 24 is a release solenoid valve 38 coupled to the piston housing 30 and electrically connected to the control switch 26. When the control switch 26 is turned in an opposite direction, the compressed air will exit the piston housing 30, causing the piston rod 32 to be retracted back into the piston housing 30.

The locking component 28 contains a lock mechanism 40 connected to the control switch 26. A key 42 is for engaging the lock mechanism 40 to prevent operation of the control switch 26.

Figure 2:
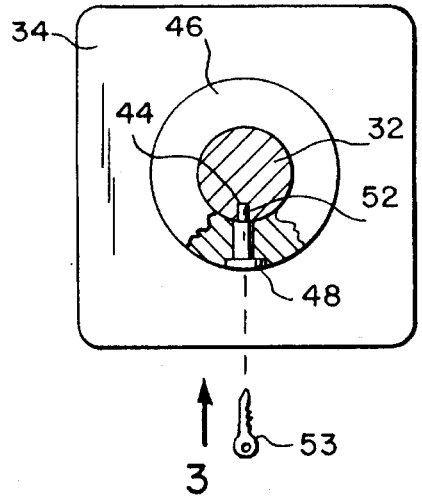
FIG. 2 is an enlarged cross sectional view taken along line 2—2 in FIG. 1.
Figure 3:
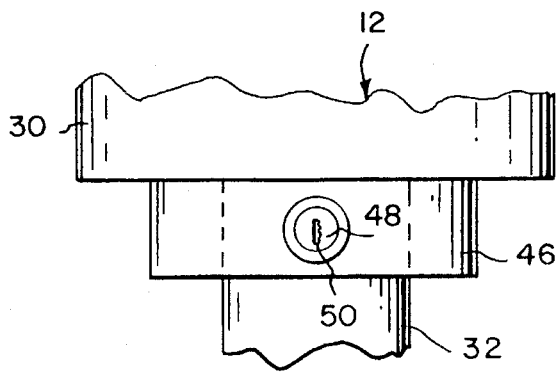
FIG. 3 is an enlarged elevational view with parts broken away taken in the direction of arrow 3 in FIG. 2, showing the locking collar in greater detail.

As best seen in FIGS. 2 and 3, the piston rod 32 has an indent 44 that is exposed when the piston rod 32 is in its extended position. A collar 46 slides upon the piston rod 32. A cylinder lock 48 is provided, having a keyway 50 and a finger 52. the cylinder lock 48 is mounted within the collar 46. A key 53 is insertable into the keyway 50 of the cylinder lock 48, to cause the finger 52 to project into the indent 44 in the piston rod 32, to prevent the piston rod 32 from retracting back into the piston housing 30.

OPERATION OF THE INVENTION

To use the pneumatic rack system 10, a person simply opens the lock mechanism 40 with the key 42 and turns the control switch 26 in one direction. This will open the pressure solenoid valve 36 in the air hose line 34. The piston rod 32 will extend from the housing 30 to make the base plate 34 contact the ground 22 and raise the motor vehicle. When the control switch 26 is turned in an opposite direction to release the solenoid valve 38, the piston rod 32 will retract back into the housing 30 to lower the motor vehicle. The cylinder lock 48, when activated by the key 53, can hold the collar 46 to the piston rod 32 when in the extended position. This will prevent the piston rod 32 from retracting back into the housing 30, even if the control switch is unlocked and operating.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A pneumatic jack system for a motor vehicle comprising a) a pneumatic jack;

b) a bracket for mounting said pneumatic jack to a suspension assembly of the motor vehicle between two wheels;

c) means for extending said pneumatic jack to the ground to raise the motor vehicle;

d) means for retracting said pneumatic jack from the ground to lower the motor vehicle;

e) a control switch in the interior of the motor vehicle, for operating said extending means and said retracting means;

f) means for looking said control switch to prevent an unauthorized operation of said pneumatic jack;

g) a piston housing h) a piston rod extending downwardly from said housing;

i) a base plate connected to a distal end of said piston rod, which will contact the ground when said piston rod is extended; wherein said extending means includes:

j) an air hoes line connected to said piston housing, for supplying pressurized air thereto;

k) a pressure solenoid valve located in said air hose line and electrically connected to said control switch, so that when said control switch is turned in one direction compressed air will enter said piston housing, causing said piston rod to be extended from said piston housing; wherein said retracting means includes a release solenoid valve coupled to said piston housing and electrically connected to said control switch, so that when said control switch is turned in an opposite direction, the compressed air will exit said piston housing, causing said piston rod to be retracted back into said piston housing; wherein said locking means includes:

l) a lock mechanism connected to said control switch;

m) a key for engaging said lock mechanism to prevent operation of said control switch; further including:

n) said piston rod having an indent that is exposed when said piston rod is in its extended position;

o) a collar that slides upon said piston rod;

p) a cylinder lock having a keyway and a finger, said cylinder lock is mounted within said collar and q) a key insertable into the keyway of said cylinder lock to cause said finger to project into said indent in said piston rod, to prevent said piston rod from retracting back into said piston housing.

2. A pneumatic jack system for a motor vehicle comprising:

a) a pneumatic jack;

b) a bracket for mounting said pneumatic jack to a suspension assembly of the motor vehicle between two wheels;

c) means for extending said pneumatic Jack to the ground to raise the motor vehicle;

d) means for retracting said pneumatic jack from the ground to lower the motor vehicle;

e) a control switch in the interior of the motor vehicle, for operating said extending means and said retracting means;

f) means for locking said control switch to prevent an unauthorized operation of said pneumatic jack;

g) a piston housing:

h) a piston rod extending downwardly from said housing;

i) a base plate connected to a distal end of said piston rod, which will contact the ground when said piston rod is extended; wherein said extending means includes:

j) an air hose line connected to said piston housing, for supplying pressurized air thereto;

k) a pressure solenoid valve located in said air hose line and electrically connected to said control switch, so that when said control switch is turned in one direction compressed air will enter said piston housing, causing said piston rod to be extended from said piston housing; wherein said retracting means includes a release solenoid valve coupled to said piston housing and electrically connected to said control switch, so that when said control switch is turned in an opposite direction, the compressed air will exit said piston housing, causing said piston rod to be retracted back into said piston housing; wherein said locking means includes:

l) a lock mechanism connected to said control switch;

m) a key for engaging said look mechanism to prevent operation of said control switch; in further combination with auxiliary locking means slidably mounted on said piston rod clear of said piston housing preventing retraction into said piston housing when in one position and allowing retraction into said piston housing when in a second position.

\* \* \* \* \*